(12) United States Patent
Kumar et al.

(10) Patent No.: US 7,928,596 B2
(45) Date of Patent: Apr. 19, 2011

(54) SYSTEMS AND METHODS FOR THE UTILIZATION OF ENERGY GENERATED BY A POWERED VEHICLE

(75) Inventors: Ajith Kuttannair Kumar, Erie, PA (US); Amit Pandey, Bangalore (IN)

(73) Assignee: General Electric Company, Schenectady, NY (US)

( * ) Notice: Subject to any disclaimer, the term of this patent is extended or adjusted under 35 U.S.C. 154(b) by 193 days.

(21) Appl. No.: 12/245,941

(22) Filed: Oct. 6, 2008

(65) Prior Publication Data

US 2010/0084916 A1   Apr. 8, 2010

(51) Int. Cl.
*B60L 1/00* (2006.01)
(52) U.S. Cl. ................................................. 307/9.1
(58) Field of Classification Search ............ 307/9.1, 307/10.1
See application file for complete search history.

(56) References Cited

U.S. PATENT DOCUMENTS

| | | | |
|---|---|---|---|
| 3,928,961 A | 12/1975 | Pfefferle | |
| 4,507,720 A | 3/1985 | Colbrese | |
| 5,094,309 A * | 3/1992 | Vlaanderen et al. | 180/53.7 |
| 5,202,303 A | 4/1993 | Retallick et al. | |
| 5,258,349 A | 11/1993 | Dalla Betta et al. | |
| 5,328,359 A | 7/1994 | Retallick | |
| 5,725,228 A * | 3/1998 | Livingston | 280/414.1 |
| 5,767,584 A * | 6/1998 | Gore et al. | 290/1 R |
| 6,107,691 A | 8/2000 | Gore et al. | |
| 6,174,159 B1 | 1/2001 | Smith et al. | |
| 6,349,248 B1 | 2/2002 | Dean et al. | |
| 6,358,040 B1 | 3/2002 | Pfefferle et al. | |
| 6,394,791 B2 | 5/2002 | Smith et al. | |
| 6,486,568 B1 | 11/2002 | King et al. | |
| 6,619,043 B2 | 9/2003 | Bruck et al. | |
| 6,630,423 B2 | 10/2003 | Alvin et al. | |
| 6,673,479 B2 * | 1/2004 | McArthur et al. | 429/513 |
| 6,748,745 B2 | 6/2004 | Ul Karim et al. | |
| 6,752,623 B2 | 6/2004 | Smith et al. | |
| 6,810,670 B2 | 11/2004 | Bruck et al. | |
| 6,923,001 B2 | 8/2005 | Laster et al. | |
| 6,973,880 B2 | 12/2005 | Kumar | |
| 7,189,376 B2 | 3/2007 | Kumar et al. | |
| 7,231,877 B2 | 6/2007 | Kumar | |
| 7,619,319 B1 * | 11/2009 | Hunter | 290/4 R |
| 2001/0006934 A1 | 7/2001 | Kachi et al. | |
| 2006/0080968 A1 | 4/2006 | Griffin et al. | |
| 2006/0119177 A1 | 6/2006 | Kumar et al. | |
| 2006/0225429 A1 | 10/2006 | Szedlacsek et al. | |
| 2007/0098604 A1 | 5/2007 | Smith et al. | |
| 2008/0037190 A1 | 2/2008 | Datta et al. | |

* cited by examiner

*Primary Examiner* — Albert W Paladini
(74) *Attorney, Agent, or Firm* — Robert Wawrzyn, Esq.; Terry M. Sanks, Esq.; Beusse Wolter Sanks Mora & Maire, P.A.

(57) ABSTRACT

The present invention is directed to a power transfer system and method for utilizing the electrical power generated by a powered vehicle, such as a locomotive. The power transfer system comprises an electromotive machine configured to generate electrical energy on the powered vehicle and an electrical system located outboard from the powered vehicle, which is configured to receive electrical energy. Interface equipment is provided, which is electrically coupled to the electromotive machine and the electrical system, to transfer electrical energy from the electromotive machine to the electrical system.

19 Claims, 4 Drawing Sheets

SYSTEMS AND METHODS FOR THE UTILIZATION OF ENERGY GENERATED BY A POWERED VEHICLE

FIELD OF THE INVENTION

The invention relates generally to methods and systems for energy generation and transfer, and more particularly to methods and systems for utilizing electrical energy generated by a powered vehicle, e.g., a locomotive.

BACKGROUND OF THE INVENTION

Certain relative large land-based vehicles, such as locomotives, transit vehicles, off-highway vehicles (e.g., mining trucks), and the like, include electric traction motors to provide the force to move the vehicle. In the case of a locomotive, a diesel engine drives an alternator, which supplies current to drive the traction motors, and which, in turn, propels the locomotive and any train cars attached thereto forward or backward. When propelled as such, a locomotive is said to be motoring. Further, the traction motors may change configuration to perform an additional function. In particular, once the locomotive is in motion, the traction motors may be configured to generate rather than consume electricity. As generators, the traction motors typically convert the locomotive's kinetic energy into electrical energy, and as a result, slow the locomotive. Using the traction motors to reduce speed is referred to as dynamic braking. A number of conventional locomotives do not store the generated electrical energy, but rather transfer the generated electricity to electrically resistive grids, also known as braking grids or a load box, to convert the electrical energy into heat energy, which is vented to the atmosphere via the resistive grids.

In addition, such resistive grids are also commonly used for "self-load" testing of the locomotive. Self-load testing refers to the use of the resistance grids as a form of a dynamometer or load bank to test the horsepower of the locomotive engine and/or the output of the alternator. During self-load testing, the generator output is delivered to the resistive grids instead of the traction motors while the locomotive is stationary. Thus, in known locomotives, the power (energy) produced during self-load testing is typically dissipated as heat by the resistance grids. The dissipating of heat is a waste of power, results in the dissemination of undesirable greenhouse gases, and provides no useful benefit.

BRIEF DESCRIPTION OF THE INVENTION

In accordance with one aspect of the present invention, there is provided a method for utilizing electrical energy generated by a powered vehicle, such as a locomotive. The method comprises generating electrical energy via an electromotive machine on the powered vehicle and transferring at least a portion of the electrical energy to an electrical system located outboard of the powered vehicle via interface equipment electrically coupled to the electromotive machine and the electrical system.

In accordance with another aspect of the present invention, there is provided a power transfer system for a powered vehicle comprising an electromotive machine configured to generate electrical energy on the powered vehicle. In addition, the system includes an electrical system located outboard from the powered vehicle and configured to receive electrical energy. Further, the system includes interface equipment, which is electrically coupled to the electrical system and is configured to transfer electrical energy from the electromotive machine to the electrical system. Moreover, the system includes a controller configured to determine an amount of electrical energy transferred to the electrical system over a period of time. In addition, the controller is configured to transmit information relating to the generation of revenue based on the amount of electrical energy transferred to the electrical system.

In accordance with another aspect of the present invention, there is provided a method for utilizing electrical energy generated by a powered vehicle. The method comprises receiving, at an electrical system located outboard of the powered vehicle, electrical energy generated by an electromotive machine on the powered vehicle. In addition, the method comprises determining revenue information based on an amount of the electrical energy received at the electrical system, wherein the revenue information relates to a value of the amount of electrical energy.

BRIEF DESCRIPTION OF THE DRAWINGS

A more particular description of the embodiments of the invention briefly described above will be rendered by reference to specific embodiments thereof that are illustrated in the appended drawings. Understanding that these drawings depict only typical embodiments of the invention and are not therefore to be considered to be limiting of its scope, the embodiments of the invention will be described and explained with additional specificity and detail through the use of the accompanying drawings in which.

DETAILED DESCRIPTION OF THE INVENTION

A more particular description of the invention briefly described above will be rendered by reference to specific embodiments thereof that are illustrated in the appended drawings. Similar or identical number references in different figures may be utilized to indicate similar or identical components among different embodiments of the present invention. In addition, understanding that these drawings depict only typical embodiments of the invention and are not therefore to be considered to be limiting of its scope, the invention will be described and explained in the context of a locomotive. However, the invention is not so limited but may be applicable to off-highway vehicles, marine vehicles, on-road vehicles, etc. The term "powered vehicle" as used herein shall comprise a power generation system for converting mechanical energy to electrical energy.

The present invention is directed to a power transfer system and method that enables electrical energy generated by a powered vehicle to be transferred from the powered vehicle to an outboard electrical system, such as a commercial electric utility. Thus, the proposed system, instead of eliminating useful electrical energy as heat in resistors, transfers the electrical energy generated by the powered vehicle to an electrical system for the sale or beneficial use of the electrical energy. Advantageously, the present invention may be implemented before, during, or after self-load testing of the powered vehicle as the powered vehicle is generally in a stationary position at such time. In an embodiment, power normally dissipated as heat during self-load testing is instead converted to electrical energy and directed to an electrical system for use or sale thereof.

Figure 1A:
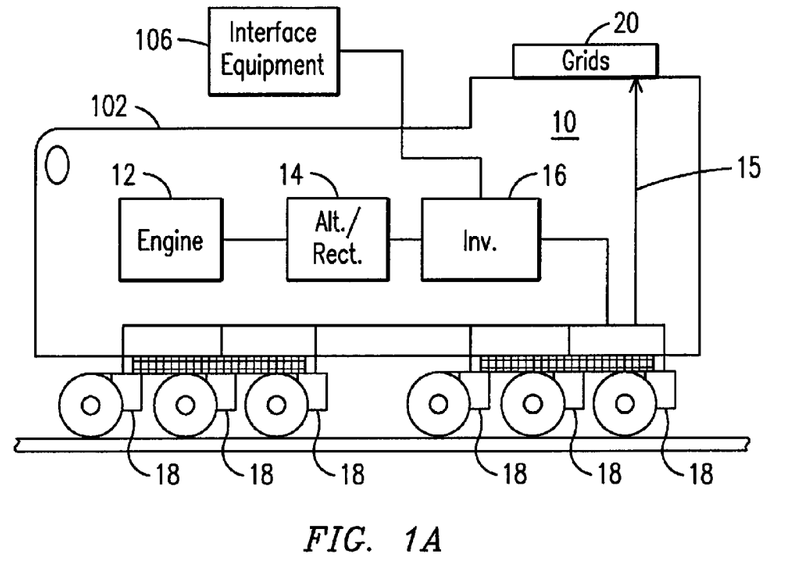
FIG. 1A is a block diagram of a power system of a diesel-electric locomotive.

FIG. 1A is a block diagram of an exemplary power generation system 10 of a powered vehicle, e.g., locomotive 102, in communication with interface equipment 106, which will be discussed in detail further below. The locomotive 102 may be a diesel-electric locomotive such as, for example, the AC6000 or the AC4400, both of which are available from General Electric Transportation Systems. Typically, as shown in FIG. 1A, the locomotive 102 includes a diesel engine 12 for driving an alternator/rectifier 14 ("Alt./Rect." in FIGS. 1A and 1B). As is generally understood in the art, in a typical AC diesel-electric locomotive application, the AC electric power from the alternator 14 is first rectified (converted to DC). The rectified AC is thereafter inverted (e.g., using power electronics such as insulated-gate bipolar transistors (IGBT's) or thyristors operating as pulse width modulators) at inverter 16 ("Inv." in FIG. 1A) to provide a suitable form of AC power for the respective traction motor 18. One common locomotive configuration includes one inverter/traction motor pair per axle of the locomotive 102. Such a configuration results in three inverters per truck, and six inverters and traction motors per locomotive. For convenience, FIG. 1A illustrates a single inverter 16.

As is understood in the art, traction motors 18 provide the tractive power to move locomotive 102 and any other vehicles, such as load vehicles, attached to locomotive 102. Such traction motors 18 may be AC or DC electric motors. When using DC traction motors, the output of the alternator 14 is typically rectified to provide appropriate DC power and no inverter is provided. When using AC traction motors, the alternator output is typically rectified to DC and thereafter inverted to three-phase AC before being supplied to traction motors 18 via the inverter as described above.

The traction motors 18 also provide a braking force for controlling speed or for slowing locomotive 10. This is commonly referred to as dynamic braking, and is generally understood in the art. Simply stated, when a traction motor is not needed to provide motivating force, it can be reconfigured (via power switching devices) so that the motor operates as a generator. In this way, the traction motor generates electric energy, which has the effect of slowing the locomotive. Typically, the energy generated in the dynamic braking mode is transferred to resistance grids 20 on the locomotive.

Figure 1B:
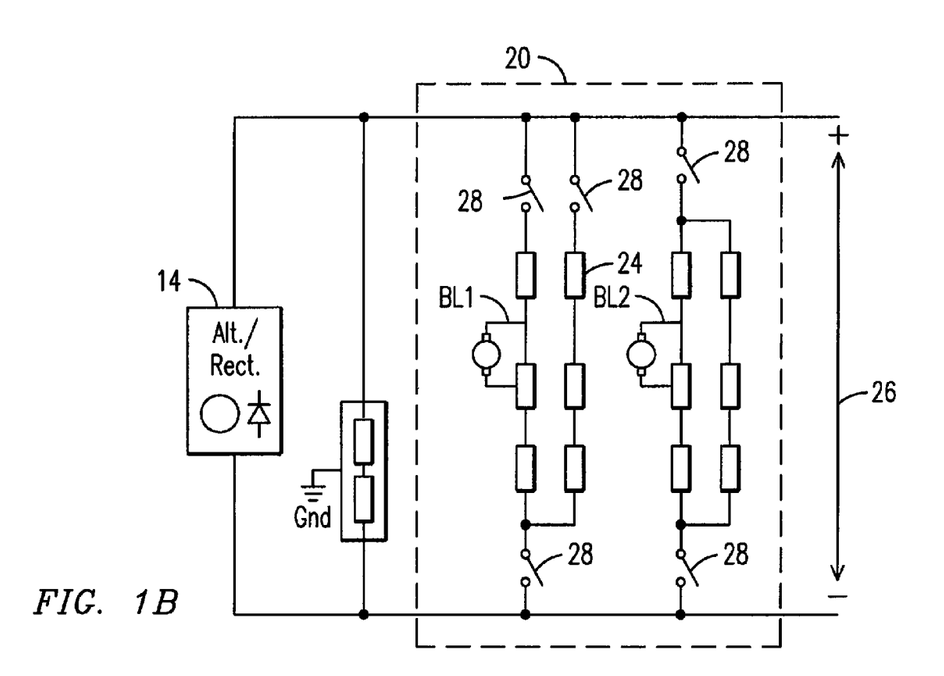
FIG. 1B is an electrical schematic of a portion of a power system of a diesel-electric locomotive.

As shown in FIG. 1B, resistance grids, e.g., exemplary resistive grid 20, may include a plurality of contactors 28 for switching a plurality of power resistive elements or resistors 24 between the positive and negative rails of a power bus 26. Each vertical grouping of resistors 24 may be referred to as a string. One or more power grid cooling blowers (e.g., BL1 and BL2) are normally used to remove heat generated in a string due to dynamic braking. It should be noted that, in a typical DC locomotive, the resistance grids are connected to the traction motors. However, in a typical AC locomotive, the resistance grids are also electrically connected to a power bus 26 because each traction motor is normally connected to the power bus 26 by way of an associated inverter. FIG. 1A generally illustrates an AC locomotive with a plurality of traction motors. A single inverter is depicted for convenience.

In order to confirm that the locomotive engine is delivering the desired power or rated horsepower, oftentimes modern AC and DC locomotives are configured for "self-load" testing. Self-load testing refers to the use of resistance grids as a form of a dynamometer or load bank to test the horsepower of the locomotive engine 12 and alternator 14. Referring again to FIG. 1B, with the locomotive stationary, a plurality of contactors 28 close such that the engine output is delivered to the grids 20 instead of to the traction motors (not shown) located downstream. The transfer of energy to grids 20 from traction motors 18 is also shown in FIG. 1A by arrow 15. Typically, the grids 20 are sufficiently large to absorb the full engine output power, which is calculated from voltage and current output. In the known locomotives, the power (energy) produced during self-load testing is dissipated as heat on the resistance grids 20. Accordingly, known locomotives typically waste the energy generated from self-load testing. Conversely, aspects of the present invention enable all or a portion of the electrical energy generated by a locomotive, such as during self-load testing of the locomotive, to be transferred to an electrical system located outboard from the locomotive for the beneficial use or sale thereof via interface equipment 106 as shown in FIG. 1A and in FIG. 2.

Figure 2:
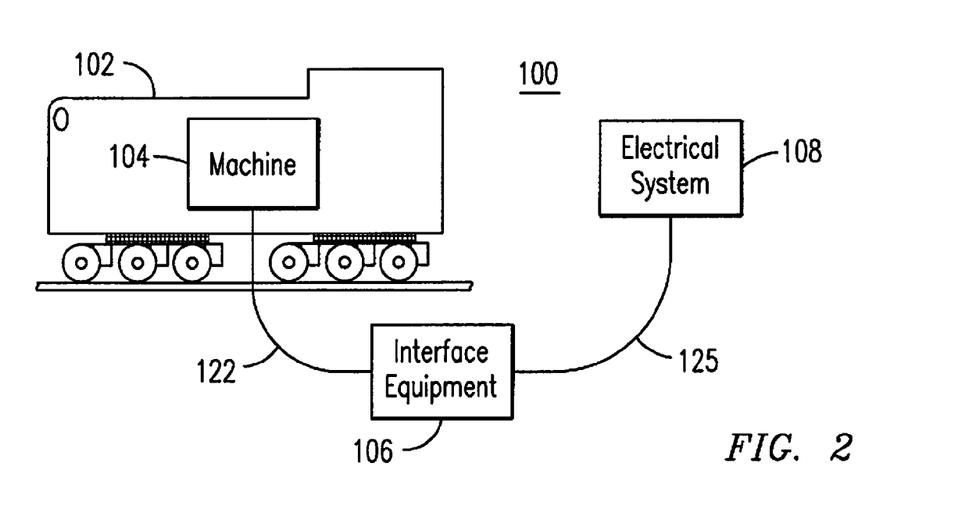
FIG. 2 is a block diagram of a power transfer system in accordance with an aspect of the present invention.

FIG. 2 depicts a further detailed embodiment of a power transfer system 100 in accordance with the present invention. The power transfer system 100 comprises a powered vehicle, e.g., locomotive 102, having an electromotive machine 104 in electrical communication with interface equipment 106, which is in turn in electrical communication with an electrical system 108. In the embodiment shown, the interface equipment 106 is shown as being located outboard from the locomotive 102. However, it is understood, that any one or more of the components comprising the interface equipment 106 may be located onboard the locomotive in other embodiments.

By "electrical system," it is meant any apparatus, system, or location that is able to receive the electrical energy. In an embodiment, the electrical system 108 is able to both receive and store energy. For example, the electrical system 108 may include, but is not limited to, an electric utility having a plurality of grids to receive and store electrical energy thereon, as well as the infrastructure to sell or transfer the received and/or stored electrical energy to another entity for value if so desired. In an embodiment, by "electric utility," it is meant any entity that engages in the generation, transmission, and/or distribution of electricity for sale or use, such as a commercial utility company. Alternatively, the electrical system 108 may be any facility that can utilize the electrical power, such as a plant, a commercial business, a factory, or the like.

By "electromotive machine," it is meant any system or machine that is capable of converting mechanical/electrochemical energy to electrical energy. In one embodiment, the electromotive machine 104 of the locomotive 102 may be of any suitable configuration known to generate electrical energy from mechanical energy. In another embodiment, the electromotive machine may comprise one or more batteries, fuel cells, photovoltaic cells, the like, or any other suitable source for generating electricity.

Figure 3:
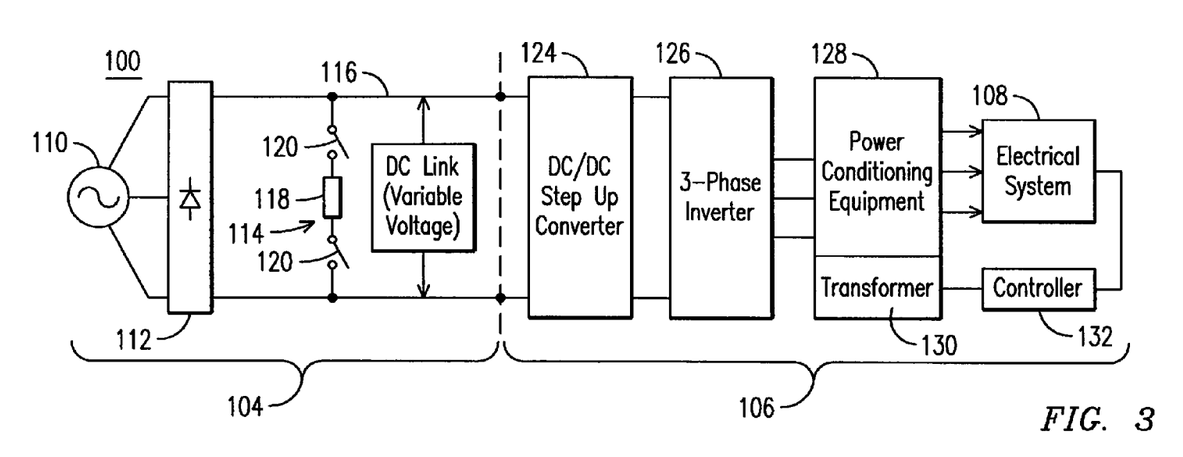
FIG. 3 is another block diagram of a power transfer system in accordance with an aspect of the present invention.

In a particular embodiment, as shown in FIG. 3, the electromotive machine 104 (having DC/AC traction motors) comprises a traction alternator 110 as known in the art for converting the mechanical energy delivered from an engine (not shown) of a locomotive 102 to AC electrical energy, and a rectifier 112 for converting the electrical energy from the alternator 110 from AC to DC power. Optionally, the locomotive 102 includes a resistive grid 114 as shown for optionally dissipating energy from the rectifier 112, and a power bus 116 having two poles that typically directly or indirectly carry the rectified power from the rectifier 112 to a downstream location. However, it is understood that not all locomotives include a resistive grid and the invention is not so limited to power vehicles having a resistive grid. Accordingly, in such locomotives without a resistive grid, excess energy may be dissipated by any other suitable method known in the art.

In an embodiment of a locomotive 102 having a resistive grid 114, the resistive grid 114 typically includes a plurality of resistors 118 and a plurality of contactors 120 that act as a switch to divert electricity from the alternator 110 and the rectifier 112 to the resistors 118 as is desired. For example, during the typical self-load testing performed in the field, the contactors 120 are in the closed position (opposite of the position shown in FIG. 3) to direct the load to the resistive grid 114. In this way, electrical energy is transferred from the alternator 110 to the resistive grid 114 rather than to the traction motors (not shown) of the locomotive 102 as is the case during movement of the locomotive 102. For the sake of simplicity, one resistor 118 and a pair of contactors 120 are shown, although it is understood that the resistive grid 114 will include a plurality of resistors 118 and contactors 120, e.g., as shown in FIG. 1B.

In one aspect of the present invention, when electrical energy is desired to be transferred from the electromotive machine 104 to an external source, e.g., the electrical system 108, the contactors 118 may remain in the open position such that the power from the alternator 110 bypasses the resistive grid 114 and instead directs energy to the power bus 116. In a typical locomotive, electrical power is transferred from the power bus 116 directly to the traction motors if the traction motors are DC traction motors. Alternatively, if the traction motors are AC traction motors, the power bus 118 is electrically connected to an inverter (not shown), which converts the DC power to AC power for the traction motors. In the present invention, in either case, the power bus 116 may be electrically connected to interface equipment 106 as set forth below when the locomotive 102 is stationary to receive the electrical energy from the electromotive machine 104. Alternatively, the interface equipment may be electrically connected to the rectifier 112 or alternator 110 to receive electrical energy therefrom. Thereafter, when the locomotive 102 is generating electrical energy, such as during self-load testing of the locomotive 102, an amount of electrical energy may be transferred from the interface equipment 106 to the electrical system 108 as described herein.

The interface equipment 106 may be provided as one or more modular units and may be located outboard or onboard the powered vehicle, e.g., locomotive. In an embodiment, as shown in FIG. 2, the interface equipment 106 is located outboard of the locomotive 102. In a particular embodiment, the interface equipment 106 may be a stationary unit located within a maintenance depot or other test facility and may be electrically connected to the power bus 116 of the locomotive 102 when the locomotive 102 is at the maintenance depot or test facility. Alternatively, the interface equipment may be electrically connected to the rectifier 112 or the alternator 110.

Further alternatively, the interface equipment 106 may be a mobile unit, which is transportable to a location of the locomotive 102 from which electrical energy is to be obtained. When electrically connected to the power bus 116, rectifier 112, or alternator 110 via an interface cable 122 (or the like) of the electromotive machine 104 as shown in FIG. 2, the interface equipment 106 captures electrical energy generated by the locomotive 102 and converts the energy (if necessary) to a form suitable for transfer to the electrical system 108, which may utilize, further transfer, and/or sell the electrical energy.

In an embodiment, as is also shown in FIG. 3, the interface equipment 106 comprises a DC/DC step up converter 124 (or other DC/DC converter), a 3-phase (or other) inverter 126, power conditioning equipment 128, and a first controller 132. The DC/DC converter 124 accepts a DC input voltage from the power bus 116 and produces a DC output voltage to be delivered to the inverter 126, which may be different from the DC input voltage to the converter 124. The inverter 126 transforms the power from DC energy to AC energy. In an embodiment, the inverter 126 may be a three-phase inverter comprising three single phase inverter switches, each connected to one of the three load terminals to each produce an output of AC power having a frequency of 50-60 Hz. From the inverter 126, the AC power may be directed to power conditioning equipment 128 as shown. The power conditioning equipment 128 may also comprise a transformer 130 for conditioning electrical power to make the energy suitable for the electrical system 108. In one embodiment, the power conditioning equipment 128 selectively modifies the electrical power to be of a predetermined current, frequency, voltage, or the like. From the power conditioning equipment 128, a selected amount of electrical energy can be transferred to the electrical system 108 via cables, e.g., one or more of cables 125 as shown in FIG. 2, or via any other suitable structure for transferring electrical energy.

In an embodiment, the first controller 132 comprises a processor and a memory and the first controller 132 may be configured to selectively modify any one or more of the current, frequency, voltage, or other parameter of the electrical power input into the power conditioning equipment 128 to be of a predetermined value or within a range of values. In this way, the electrical energy transferred from the power conditioning equipment 128 to the electrical system 108 may be in a form that will meet the requirements of the electrical system 108. For example, in the case where the electrical system 108 is a commercial utility, the transferred power from the interface equipment 106 will meet all code and other local, state, and federal requirements for the commercial utility. From the commercial power supply network, the power may be used, transferred, or sold as desired. In this way, the present invention enables the beneficial use of electrical energy generated by a locomotive for the commercial sale of electrical power instead of wasting the generated electrical energy.

In an embodiment, substantially all or all of the electrical energy generated by the electromotive machine 104 may be transferred to the interface equipment 106. In another embodiment, a portion of the electrical energy generated by the electromotive machine 104 may be transferred to the interface equipment 106 and a portion of the electrical energy generated by the electromotive machine 104 may be transferred to the resistive grids of the locomotive 104, e.g., resistive grid 114. In yet another embodiment, substantially all or all of electrical energy generated by the electromotive machine 104 may be transferred to the resistive grids 114 of the locomotive 102. The first controller 132 may be programmed to automatically regulate the destination of the electrical energy and amounts to be transferred as well as allow for user input of the preferred destination and amounts of electrical energy to be transferred at a particular time.

Figure 4:
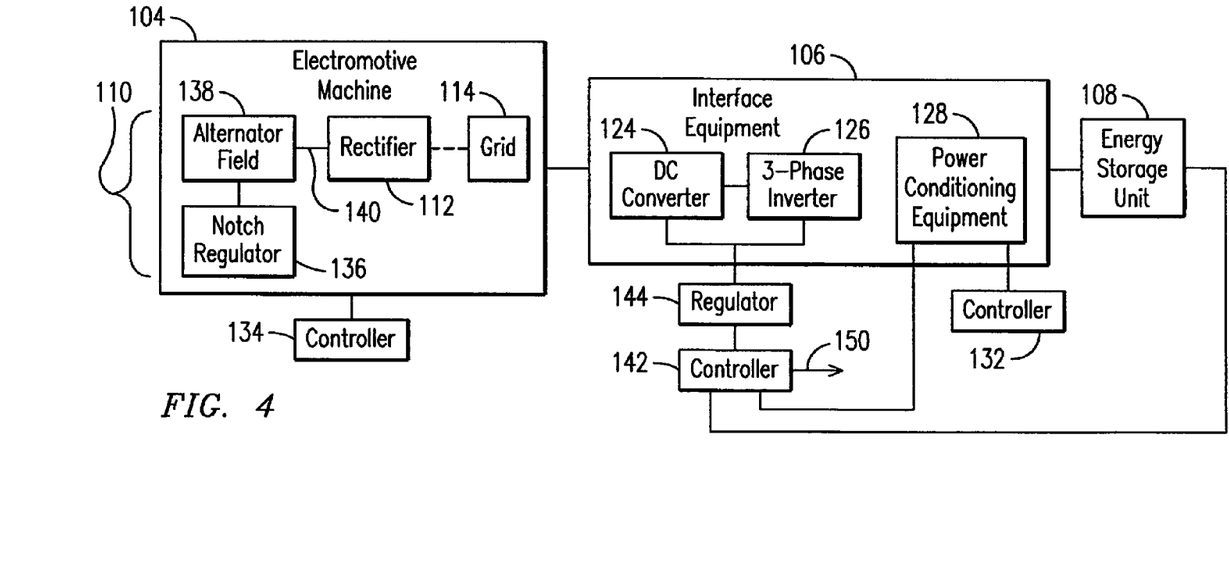
FIG. 4 is a block diagram of a power transfer system in accordance with another aspect of the present invention.

In an embodiment, as shown in FIG. 4, the system 100 may also comprise a second controller 134 associated with the electromotive machine 104 to control the amount of power output from electromotive machine 104. Specifically, the second controller 134 may regulate an amount of power distributed from the electromotive machine 104 and loaded onto the power bus 116, for example. Typically, the second controller 134 has a processor and a memory and may communicate with any other controller set forth herein in the system 100, e.g., controllers 132 and 144.

In a particular embodiment, the second controller 134 may communicate with the locomotive 102 and the electromotive machine 104 to monitor and control the power output from the engine of the locomotive 102 and the electromotive machine 104. Any suitable controller or closed feedback loop known in the art for controlling the horsepower output of the engine may be utilized. In one embodiment shown in FIG. 4, the alternator 110 may include a notch regulator 136 and a traction alternator field 138. The notch regulator 136 may be set automatically by the second controller 134 or by the user to correspond to the current position of the locomotive's throttle handle and a notch position on the locomotive 102. The notch regulator 136 regulates the amount of mechanical energy input into the alternator 110. The traction alternator field 138 produces an output of AC current 140 having a predetermined voltage.

To regulate the amount of power output from the alternator 110, the second controller 134 is configured to regulate a locomotive notch setting (not shown) on the locomotive that corresponds to an electrical energy output of the electromotive machine 104. Thus, for example, if the second controller 134 desires a particular predetermined output, the notch setting on the locomotive 102 could automatically be set to a value of four (4), for example. If the second controller 134 is directed by another controller, e.g., controller 142 discussed below, or otherwise determines that a greater amount of electrical energy is desired to be transferred to the electrical system 108, the notch setting could be automatically increased via the second controller 134.

In addition, the second controller 134 may monitor a voltage or current output from the alternator 110 on the power bus 116. If the output energy is not the desired amount, the second controller 134 may adjust the contactors 120 such that if the second controller determines that there is an excess of electrical energy output from the alternator 110, the contactors 120 may be moved to a closed position to direct the power to the resistive grid 114 instead of to the power bus 116. The power at the resistive grid 114 may be dissipated as heat as is known in the art. The second controller 134 may also control the duration the contactors 120 remain in the closed position.

As is also shown in FIG. 4, the interface equipment 106 may also include a third controller 142 for measuring a power output from the interface equipment 108. (Alternatively, the second controller 134 could be programmed to carry out the functions of the third controller 142.) The third controller 142 is configured to determine an amount of electrical energy transferred to the electrical system 108 over a period of time. As a result of the transfer of electrical energy, the third controller 142 is conducive for generating revenue based on the amount of electrical energy transferred to the electrical system 108.

For example, the third controller 142 may be configured to transmit information 150 (such as to an electrical utility or other electrical system) relating to the generation of revenue based on the amount of electrical energy transferred to the electrical system 108. The information could include, for example, the amount of energy transferred and an identity of the entity (e.g., owner of the locomotive) transferring the energy. By information "relating to" the generation of revenue, it is meant the information is used, at one point or another, for purposes of revenue generation or calculation.

In another embodiment, the interface equipment 106 may also include a regulator 144 to regulate the output of any one or more of the DC/DC converter 124, the inverter 126, and power conditioning equipment 128.

In an embodiment, the third controller 142 (or a further additional controller) may also measure a voltage and a current value of at least one of the DC/DC converter 124 or the three-phase inverter 126, and thereafter regulate an amount of electrical energy transferred from the electromotive machine 104 to the electrical system 108 via the regulator 144. In this way, the third controller 142 ensures that the interface equipment 106 does not request or deliver more power from the electromotive machine 104 to the electrical system 108 than the electromotive machine 104 can provide. It is understood that the controllers disclosed herein are merely exemplary, and that the controllers (and any the functions carried out by the controllers) may be combined, in whole or in part, as desired. Alternatively, the functions carried out by the controllers described herein may be performed by yet additional controllers.

Figure 5:
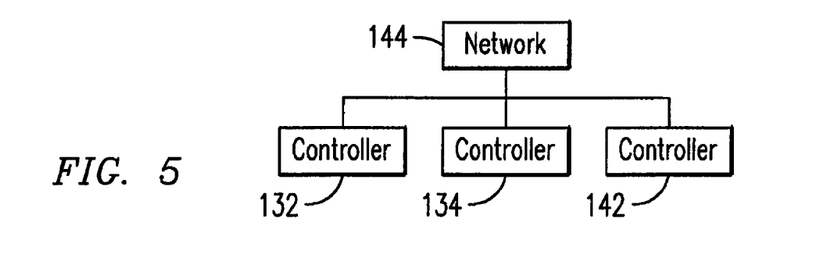
FIG. 5 is a block diagram of a power transfer system in accordance with yet another aspect of the present invention.

In one embodiment, as shown in FIG. 5, the controllers 132, 134, 142 are in continuous communication with one another over a network 144, or the like. Thus, the third controller 142, for example, may regulate an amount of electrical energy transferred to the electrical system 108 according to an amount of electrical energy produced by the electromotive machine 104. The interface equipment 106 may thus be used as a feedback reference to cause the third controller 142 to communicate to the third controller 132 whether to increase or decrease a notch position on the locomotive 102 to produce more or less mechanical energy. Alternatively, the third controller 142 may direct the first controller 132 to transfer electrical energy to the resistors 120 of the electromotive machine to dissipate some of the output energy from the electromotive machine 104 as heat if it is determined that less electrical energy should be transferred to the electrical system 108.

Figure 6:
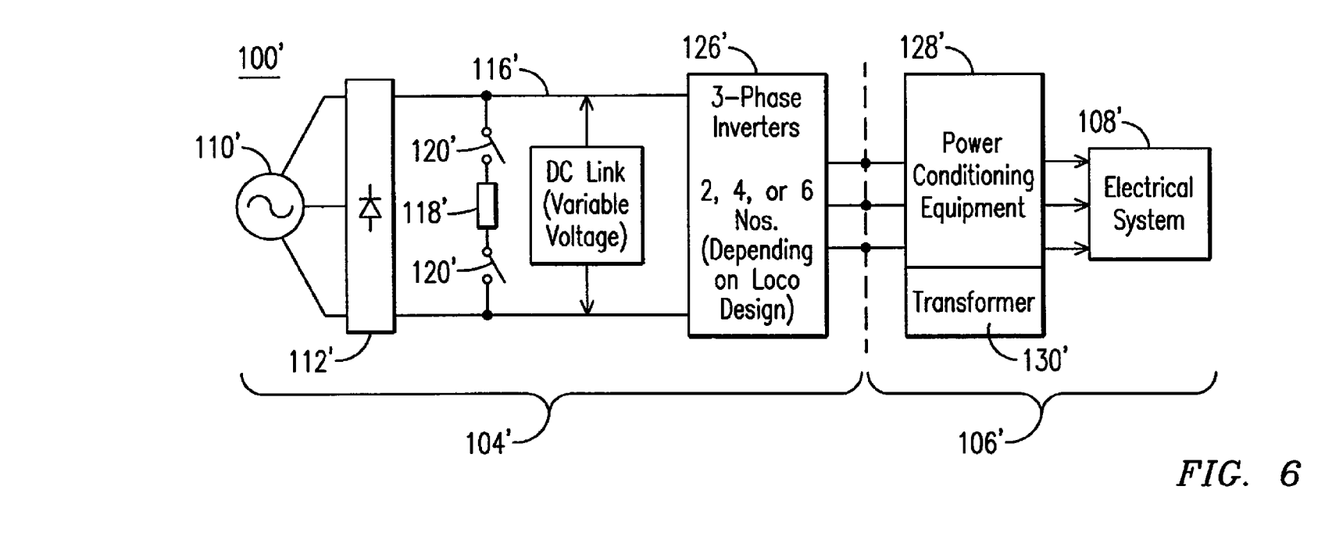
FIG. 6 is a block diagram showing a plurality of controllers in communication with one another in accordance with another aspect of the present invention.

In yet another embodiment, as shown in FIG. 6, a system 100' is provided that may incorporate any component as described above for system 100 except that system 100' is modified to accommodate locomotives having an onboard inverter and AC traction motors. In the embodiment shown in FIG. 6, the electromotive machine 104' of the system 100' includes an alternator 110', rectifier 112', resistance grid 114', and power bus 116' as described above. Additionally, the electromotive machine 104' includes an inverter, and typically a 3-phase inverter 126', onboard the locomotive 102' rather than within the interface equipment 106'. As a result, three phase AC power may be transferred from the inverter 126' to an electrical system 108' via interface equipment 106'. The interface equipment 106' may be placed in electrical communication with the alternator 110', rectifier 112', or 3-phase inverter 126' via a plurality of cables or the like.

In an embodiment, the interface equipment 106' of the present embodiment comprises power conditioning equipment 128' for modifying the electrical energy to a form suitable for the electrical system 108', which may optionally include a transformer 130' as shown. The interface equipment 106' may also be in electrical communication with the electrical system 108' via a plurality of cables or the like. There may be a plurality of 3-phase inverters 126', e.g., 2 inverters, 4 inverters, or 6 inventors, depending on the design and configuration of the locomotive in question.

Embodiments of the invention may also be described as a method or computer program (e.g., a computer program that when executed by a controller/processor, causes the controller/processor to carry out the method). With respect to FIG. 7, there is a flow chart showing different steps of a method 200 according to one embodiment of the present invention. The method first comprises a step 202 of generating electrical energy via an electromotive machine 104 on the powered vehicle, e.g., locomotive 102. The generating of electrical energy is generally performed when the locomotive is stationary, such as before or after self-load testing of the powered vehicle, e.g., locomotive 102. In step 202, the method further includes transferring at least a portion of the electrical energy to an electrical system 108 located outboard of the powered vehicle, e.g., locomotive 102, via interface equipment 106 electrically coupled to the electromotive machine 104 and the electrical system 108.

Figure 7:
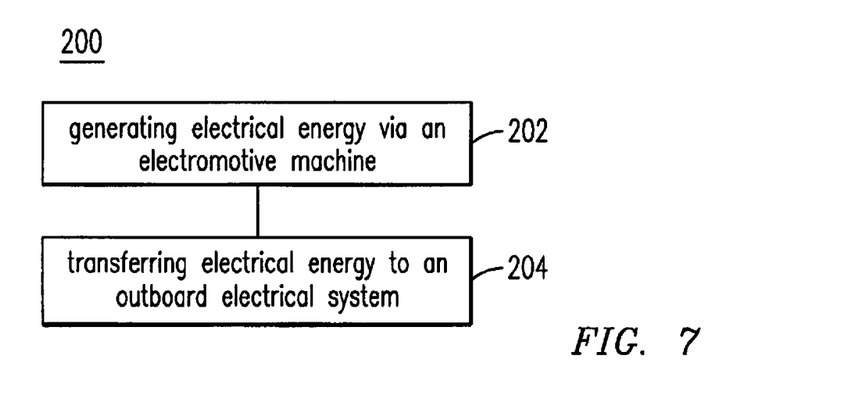
FIG. 7 is a flow diagram of a method in accordance with an aspect of the present invention.

In one embodiment, the interface equipment 106 is electrically coupled to a power bus 116 on the powered vehicle and is electrically coupled to the electrical system 108. In another embodiment, the transferring of the electrical energy may include transforming a rectified electrical energy from the electromotive machine 104 to AC electrical energy. Before the electrical energy is transferred to the electrical system 108, a parameter of the AC electrical energy may be adjusted, which is selected from the group consisting of voltage, current, and frequency. In another embodiment, the electrical system 108 is a commercial utility and the method 200 further comprises generating revenue over a period of time based on the amount of electrical energy transferred to the electrical system 108.

In one embodiment, the electromotive machine 104 is electrically coupled to a resistive grid onboard the powered vehicle, e.g., locomotive 102, and during the transferring of at least a portion of the electrical energy to the electrical system 108, the method 200 further comprises bypassing the resistive grid 20 such that at least a portion of the electrical energy is delivered to the electrical system 108.

Aspects of the present invention may provide enormous cost savings and revenue. As an illustration, a single locomotive may generate 2238 kWh per year assuming an average horsepower per locomotive of 3000 and a self-load test every six months. Thus, assuming a fleet of 200 locomotives, the electrical energy produced by the fleet could be 447,600 kWh. If 50% of this generated electrical energy is fed to a remote electrical storage unit as described herein for use or sale of the energy, at least 233,800 kWh of energy is saved. Assuming a cost of $0.10/kWh, the amount of money saved and/or generated may be at least $23,380. Moreover, this energy is not dissipated into the environment, the amount of greenhouse gases, e.g., carbon dioxide, emitted by the locomotive during self-load testing or such stationary electrical energy generation is substantially reduced.

Figure 8:
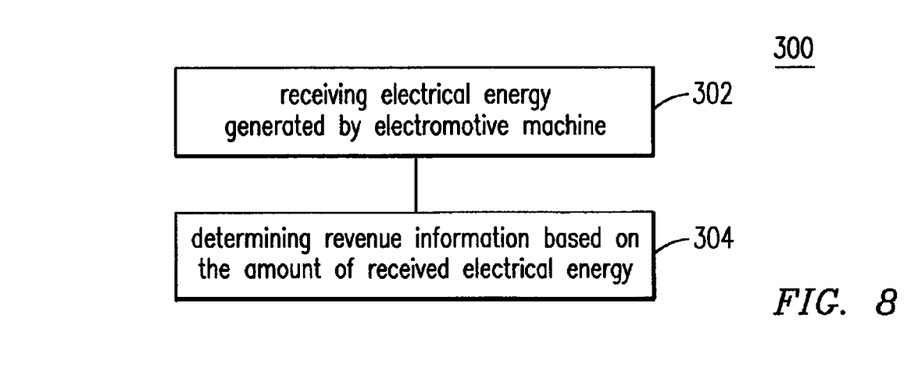
FIG. 8 is a flow diagram of a method in accordance with another aspect of the present invention.

In accordance with another aspect of the present invention, as shown in FIG. 8, there is provided a method 300 for utilizing electrical energy generated by a powered vehicle, e.g. locomotive 102. The method comprises step 302 of receiving, at an electrical system 108 located outboard of the powered vehicle (e.g. locomotive 102), electrical energy generated by an electromotive machine 104 on the powered vehicle. The method further comprises step 304 of determining revenue information 150 based on an amount of said electrical energy received at the electrical system 108, wherein the revenue information relates to a value of said amount of electrical energy.

Embodiments described above may be implemented on a suitable computer system, controller, memory, or generally a computer readable medium. For example, the steps of the methods described above may correspond to computer instructions, logic, software code, or other computer modules disposed on the computer readable medium, e.g., floppy disc, hard drive, ASIC, remote storage, optical disc, or the like. The computer-implemented methods and/or computer code may be programmed into an electronic control unit of an engine, a main control system of the locomotive, a remote control station that communicates with the locomotive unit, or the like, as described above.

This written description uses examples to disclose embodiments of the invention, including the best mode, and also to enable any person skilled in the art to make and use the embodiments of the invention. The patentable scope of the embodiments of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

That which is claimed is:

1. A method for utilizing electrical energy generated by a powered vehicle comprising:
generating electrical energy via an electromotive machine on the powered vehicle; and
transferring at least a portion of the electrical energy to an electrical system located outboard of the powered vehicle via interface equipment electrically coupled to the electromotive machine and the electrical system;
wherein the electrical system is an electric utility, and further comprising generating revenue over a period of time based on the amount of electrical energy transferred to the electric utility.

2. A method for utilizing electrical energy generated by a powered vehicle comprising:
generating electrical energy via an electromotive machine on the powered vehicle; and
transferring at least a portion of the electrical energy to an electrical system located outboard of the powered vehicle via interface equipment electrically coupled to the electromotive machine and the electrical system;
wherein the electrical energy is generated during self-load testing of the powered vehicle.

3. The method of claim 1, wherein all of the electrical energy generated by the electromotive machine is transferred to the electrical system.

4. The method of claim 1, wherein at least a portion of the electrical energy generated by the electromotive machine is transferred to the electrical system and at least a portion of the electrical energy generated by the electromotive machine is dissipated by the powered vehicle.

5. A method for utilizing electrical energy generated by a powered vehicle comprising:
generating electrical energy via an electromotive machine on the powered vehicle; and
transferring at least a portion of the electrical energy to an electrical system located outboard of the powered vehicle via interface equipment electrically coupled to the electromotive machine and the electrical system;
wherein the electromotive machine is electrically coupled to a resistive grid onboard the powered vehicle, and wherein the transferring of at least a portion of the electrical energy comprises bypassing at least a portion of the electrical energy by the resistive grid onboard the powered vehicle.

6. The method of claim 1, wherein the transferring of the electrical energy further comprises converting a rectified electrical energy from the electromotive machine to AC electrical energy.

7. The method of claim 6, further comprising adjusting a parameter of the AC electrical energy, wherein the parameter is selected from the group consisting of voltage, current, and frequency.

8. The method of claim 1, further comprising electrically coupling the interface equipment to a power bus on the powered vehicle.

9. The method of claim 1, further comprising adjusting a power output generated by the electromotive machine based upon an amount of electricity desired to be transferred to the electrical system.

10. The method of claim 1, further comprising modifying the electrical energy from the electromotive machine into a predetermined form for the electrical system.

11. The method of claim 1, wherein the interface equipment is located outboard from the powered vehicle.

12. A power transfer system for a powered vehicle comprising:
    an electromotive machine configured to generate electrical energy on the powered vehicle;
    an electrical system located outboard from the powered vehicle configured to receive a quantity of electrical energy;
    interface equipment electrically coupled to the electrical system and configured to transfer electrical energy from the powered vehicle to the electrical system; and
    a controller configured to determine an amount of electrical energy transferred to the electrical system over a period of time and configured to transmit information relating to the generation of revenue based on the amount of electrical energy transferred to the electrical system.

13. The power transfer system of claim 12, wherein the interface equipment further comprises a DC/DC converter and a three-phase inverter for converting the electrical energy to three-phase AC electrical energy.

14. The power transfer system of claim 13, wherein the interface equipment further comprises at least one second controller for measuring a voltage and a current on at least one of the DC/DC converter and the three-phase inverter and for regulating an amount of electrical energy transferred from the electromotive machine to the electrical system.

15. The power transfer system of claim 14, further comprising at least one third controller for regulating an output of electrical energy from the electromotive machine, wherein the at least one second controller and the at least one third controller are in communication with one another, and wherein the at least one third controller is onboard the powered vehicle.

16. The power transfer system of claim 15, wherein the at least one third controller is configured for regulating a powered vehicle notch setting on the powered vehicle corresponding to an electrical energy output of the electromotive machine.

17. The power transfer system of claim 12, wherein the interface equipment further comprises power conditioning equipment for selectively modifying the electrical energy from the electromotive machine into a predetermined form for the electrical system.

18. The power transfer system of claim 12, wherein the interface equipment is located outboard from the powered vehicle.

19. A method for utilizing electrical energy generated by a powered vehicle comprising:
    receiving, at an electrical system located outboard of the powered vehicle, electrical energy generated by an electromotive machine on the powered vehicle; and
    determining revenue information based on an amount of said electrical energy received at the electrical system for use by the electrical system, wherein the revenue information relates to a value of said amount of electrical energy.

* * * * *